United States Patent [19]
Zorzenon

[11] 3,959,877
[45] June 1, 1976

[54] SHEATH CUTTING TOOL FOR FLEXIBLE ELECTRICAL CABLES

[76] Inventor: Peter Zorzenon, Main St., Northport, Long Island, N.Y. 11768

[22] Filed: Oct. 14, 1975

[21] Appl. No.: 621,831

Related U.S. Application Data

[63] Continuation-in-part of Ser. No. 535,378, Jan. 3, 1975, abandoned.

[52] U.S. Cl. ................................. 30/90.3; 30/91.2
[51] Int. Cl.² .................. B21F 13/00; B26B 27/00
[58] Field of Search ................. 30/90.3, 90.2, 90.1, 30/91.2

[56] References Cited
UNITED STATES PATENTS

| | | | |
|---|---|---|---|
| 980,600 | 1/1911 | Church | 30/90.2 |
| 2,293,754 | 8/1942 | Ludke et al. | 30/90.2 X |
| 2,678,491 | 5/1954 | Thomas | 30/90.3 X |
| 2,683,930 | 7/1954 | Walters | 30/90.3 |
| 2,735,175 | 2/1956 | Tallman | 30/91.2 |
| 2,970,377 | 2/1961 | Olsen | 30/91.2 |
| 2,989,806 | 6/1961 | Davis | 30/90.3 |
| 3,057,232 | 10/1962 | Cornell | 30/90.1 X |
| 3,082,523 | 3/1963 | Modes et al. | 30/90.1 |
| 3,284,895 | 11/1966 | Selander et al. | 30/90.2 |
| 3,688,404 | 9/1972 | Muller | 30/91.2 |

FOREIGN PATENTS OR APPLICATIONS

| | | | |
|---|---|---|---|
| 670,829 | 4/1952 | United Kingdom | 30/90.1 |

*Primary Examiner*—Al Lawrence Smith
*Assistant Examiner*—J. T. Zatarga
*Attorney, Agent, or Firm*—Roberts & Cohen

[57] ABSTRACT

A portable sheath cutting tool is provided. Two collars engage the sheath of a cable at spaced positions along the same to hold the sheath in extended condition. A cylinder extends between and is rotatably supported on the collars and on the cylinder is mounted a support for turning movement about the cable. A circular saw is supported on the support in radial disposition relative to the cable. An adjusting device is provided for adjusting the radial location of the circular saw relative to the sheath. An electric motor is provided on the support for driving the circular saw through a gear train including a pair of bevel gears.

12 Claims, 2 Drawing Figures

SHEATH CUTTING TOOL FOR FLEXIBLE ELECTRICAL CABLES

This application is a continuation in part of my earlier filed copending application Ser. No. 538,378 filed Jan. 3, 1975 now abandoned.

FIELD OF INVENTION

This invention relates to power tools and, more particularly, to portable tools for cutting the sheaths of flexible electrical cables and the like.

BACKGROUND

There are a wide variety of tools which deal with cutting the sheaths on electrical cables and the like. Some of these tools are shown in U.S. Pat. Nos. 1,275,225; 2,396,442; 2,455,591; 2,678,491; 3,284,895 and 3,378,924.

H. C. Cleve in U.S. Pat. No. 1,275,225 discloses a sheath removing tool which provides for removing a cable casing. This tool comprises a body member with a longitudinally adjustable bar carried thereon and having a cutter wheel for engaging the cable casing and guide members adapted to be secured in position on opposite sides of the cable, one guide member being adapted to hold the cable so that the axis of the cable forms an oblique angle with the axis of the cutter wheel. The purpose of this tool is to provide for the removal of metallic sheathing from a cable in accordance with a specific type of process.

E. E. Shaver in U.S. Pat. No. 2,396,442 provides a portable power cable skinner having hand grips with a V-shaped cable support on the framework and a bracket pivotally mounted on this framework, therebeing furthermore provided an electric motor on the bracket with a drive shaft arranged normal to the cable support and a circular saw carried by the drive shaft. The circular saw is arranged substantially opposite the cable support and a member is carried by the bracket and formed with a slot through which the saw projects, there being furthermore provided a spring interposed between the framework and bracket for yieldably urging the saw towards the cable support.

W. S. Lindsay in U.S. Pat. No. 2,455,591 reveals a cable insulation cutting device which includes an elongated cylindrical sleeve for disposition about the insulation of the cable, there being a slot extending transversely across the body of the sleeve and a handle mounted on the sleeve adjacent one end for pivotal movement about the mounting. A cutter is provided on the handle for movement into the slot radially of the sleeve for cutting the insulation of the cable as the sleeve is rotated thereon. A split expansible guide is provided for clamping engagement with the cable to provide a continuous circumferential guiding surface for limiting axial movement of the sleeve.

O.H. Thomas in U.S. Pat. No. 2,678,491 provides a cable cutting tube with a housing having a cylindrical interior adapted to encompass a cable, the interior wall of the housing having a pair of spaced annular members forming a reduced diameter. The housing has a slot form therein extending partially around the housing and positioned between the annular members. A casting is provided on the housing having a passage formed therein with a cradle slidably mounted in the passage and a cutting blade carried by the cradle in alignment with the slot. A handle member is threadably engaged in the casting in operative engagement with the cradle to move the blade through the slot and to rotate the housing circumferentially about the cable.

E. S. Selander et al in U.S. Pat. No. 3,284,895 provides a system in which a saw guard encloses a reciprocating saw blade when a lock-grip pliers and a sliding platform are moved into a position for permitting jaws to receive a conduit that is to be cut. When the conduit is clamped in place, the operator holds a portable electric saber saw by gripping a handle with one hand and he grips the lock-grip pliers with the other hand and moves the pliers with the sliding platform in the direction which causes the reciprocating blade to cut the conduit in a plane paralleling the edges of the jaws. A removal screw or stop is mounted on a base to limit movement of the sliding platform.

P. E. Porter in U.S. Pat. No. 3,378,924 shows a cable cutting assembly including a base plate with a movable plate positioned adjacent the base plate and a micrometer calipertype member carried by the base plate and engageable with the movable plate for moving the same with respect to the base plate, there being a cutting element mounted on the movable plate and a cable holder engaged with the base plate for positioning the cable in the path of movement of the cutting element, the cable holder and base plate being relatively rotatable. A cable retainer member is adjustably mounted on the base plate, there being a probe for selective engagement with the cable conductors, signal means in circuit with the probe and cutting element and a source of electrical energy connected to the signal means for actuating the same upon engagement of the cutting element with the selected cable conductor to complete an electrical circuit.

SUMMARY OF INVENTION

It is an object of the invention to provide an improved portable sheath cutting tool.

It is another object of the invention to provide an improved tool which holds the flexible sheath of an electrical cable in such a manner as to stretch the same taut whereby an accurate cutting may be made with respect to the sheath thereof.

It is yet another object of the invention to provide a readily manipulated automatic and portable sheath cutting tool of the above-noted type.

To achieve the above and other objects of the invention, there is provided a portable sheath cutting tool comprising means to engage said sheath at longitudinally spaced positions on the latter and to hold the sheath in extended condition between said positions, there being furthermore provided a support engaged on said means for a turning movement about the sheath and cutting means on the support to turn therewith and effect a circumferential cut in and around the sheath, there being furthermore provided power means on the support to drive said cutting means.

In further accordance with the invention there is provided an adjusting means to adjust the radial positioning of the cutting means relative to said sheath and preferably said cutting means is, in accordance with the invention, a circular saw.

The first said means preferably includes two collars fastenable on the sheath of the cable at spaced position and in concentric relationship with the sheath and with each other. Furthermore, a cylinder may be provided extending between the collars and rotatably coupled thereto to allow said turning movement to be effected around the sheath, the cylinder including a bore through which the sheath extends.

The aforesaid support is preferably mounted on the cylinder by the aforesaid adjusting means, said adjusting means including a guide for guiding the support in radial direction relative to the sheath and a threaded means for threaded adjustment of the support.

Supporting the circular saw on the aforesaid support is a bearing means, there being furthermore preferably provided a gear train to couple the saw to the power means. The power means is preferably an electric motor.

In accordance with a feature of the invention, the cylinder is provided with a slot through which the above mentioned saw extends. Furthermore, the gear train may preferably include coupled bevel gears. In addition, a U-shaped bracket may be provided on the cylinder supporting the adjusting means.

In accordance with another feature of the invention, each of the aforementioned collars may include three radially disposed threaded bolts for engaging and centering the sheath, these bolts being symmetrically disposed around the sheath.

The above and other objects and features of the invention as well as advantages thereof will be found in the detailed description which follows hereinafter.

DETAILED DESCRIPTION

As has been noted hereinabove, the invention provides a portable sheath cutting tool comprising means to engage the sheath at longitudinally spaced positions on the latter, said means holding the sheath in extended condition between said positions. Furthermore, a support is engaged on these means for a turning movement about the sheath, there being cutting means provided on the support to turn therewith and effect a circumferential cut in and around the sheath, the cutting means being preferably driven by a power means also mounted on the support.

Figure 1:
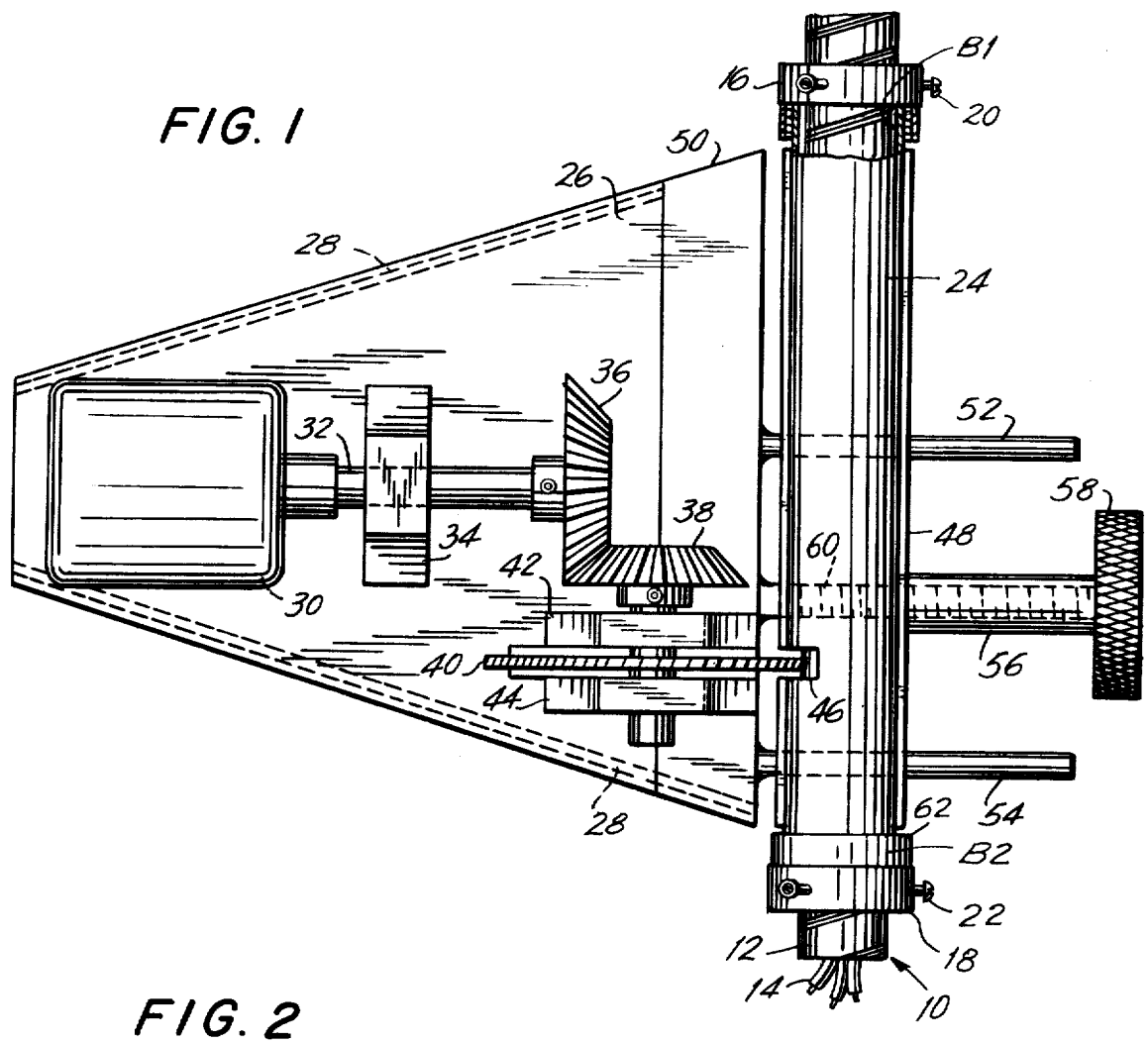
FIG. 1 is a top plan view of a sheath cutting tool provided in accordance with a preferred embodiment of the invention.
Figure 2:
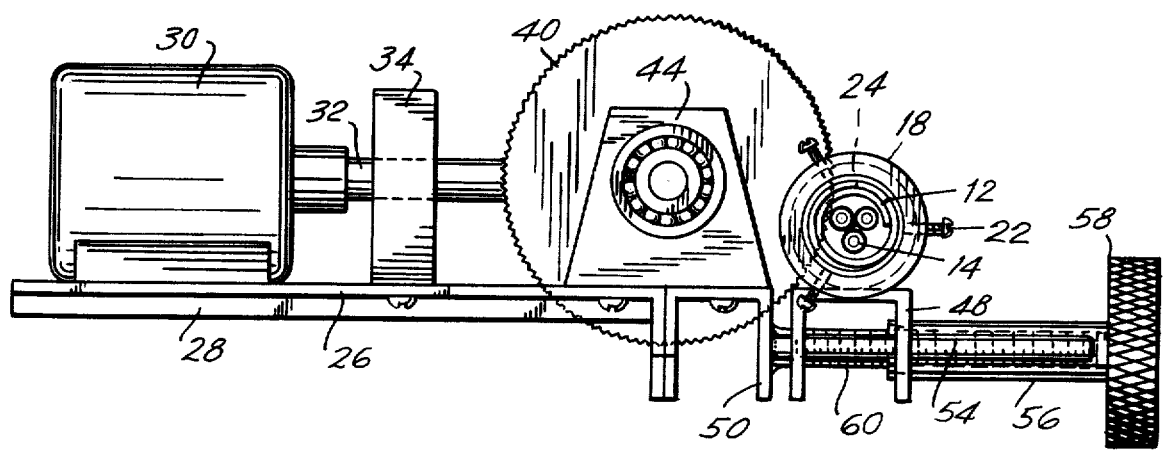
FIG. 2 is a side view partly in section of the sheath cutting tool illustrated in FIG. 1.

FIGS. 1 and 2 of the drawing illustrate a flexible electrical cable 10 having a metal sheath 12 within which are accommodated a plurality of insulated electrical lines indicated generally at 14. These lines are generally surrounded by an insulating material contained within the sheath 12. It is the purpose of the invention to provide a tool which will accurately cut the sheath 12 without cutting the insulation therebeneath or without cutting any of the electrical lines 14.

To this end, the invention provides for a pair of spaced collars 16 and 18 which include interior bores to accommodate the extension therethrough of the electrical cable, the collars 16 and 18 being mounted or fastened on the electrical cable at longitudinally spaced positions therealong. To lock the collars 16 and 18 in position on the electrical cable, there are provided a plurality of threaded bolts such as indicated at 20 and 22. The collar 16 preferably has three such bolts in radial disposition on the same and arranged symmetrically thereabout for purposes of engaging the sheath 12 of the flexible electrical cable and for centering the collar 16 with respect thereto. Similarly, the collar 18 has three such threaded bolts also radially and symmetrically disposed in order to engage the sheath 12 and center the collar 18 with respect thereto.

A cylinder 24 fabricated of metal or some other similar material of sufficient strength extends between and is rotatably coupled to the collars 16 and 18 such as, for example, by ball bearings $B_1$ and $B_2$. The cylinder 24 has a central bore through which extends the flexible electrical cable 10. The cylinder 24 holds the collars 16 and 18 in spaced position and forms in turn a means of holding a support 26 for turning movement around the cable 10.

The support 26 may consist of a flat expanse of metal provided suitably with flanges such as indicated at 28 for purposes of reinforcement. Atop the support 26 is mounted a motor 30 having a drive shaft 32 accommodated in and supported by a bearing 34 mounted on the support. A first bevel gear 36 is coupled to the shaft 32 and drives the bevel gear 38 with a stepdown gear ratio suitable for driving the circular saw 40 which constitutes the cutting means of the portable tool of the invention.

To support the circular saw 40 are provided two bearings 42 and 44 also mounted on the support 26 so that the whole unit is self-contained and readily mounted on the cable 10 which may be manually held or alternatively held in a supporting device such as a clamp.

To accommodate the penetration of the circular saw 40, the cylinder 24 is provided with a slot 46. The circular saw is radially disposed at a right angle relative to the axis of the cylinder 24 and thus is radially disposed relative to the sheath 12 which it is intended to cut.

As best appears in FIG. 2, the cylinder 24 has welded thereto a U-shaped bracket 48 whereas the support 26 has connected thereto a U-shaped bracket 50.

As best appears in FIG. 1, guide rods 52 and 54 are provided which enable the support 26 to move in and out at right angles to the lingitudinal axis of the bracket 48 and therefore at right angles to the cylinder 24 carrying therealong the circular saw 40.

A threaded adjusting member 56 is provided with a knurled knob 58, the threaded member being axially secured relative to and rotatably extending through a flange of the U-shaped bracket 48 and making extensible engagement with the U-shaped bracket 50 via threaded rod 60 as a result of which threaded adjustment between the two U-shaped brackets is possible to an extent of approximately one-quarter of an inch. This enables a sufficient adjustment of the circular saw 40 to accommodate variations in size of the sheath 12 and to provide other accommodations which may be found necessary.

In operation, the cable 10 is passed through the collars 16 and 18 of the cylinder 24 and the threaded bolts 20 and 22 are fastened in such a manner as to center the cable 10 in the bore of the aforegoing structure. The knurled knob 58 is adjusted, after the motor 30 is switched on, in order to bring the circular saw 40 against the sheath 12 to provide for a circumferential cut in and around the sheath 12. As a result, a cut is conveniently made at the end of the sheath 12 to remove a portion of the latter, such cut being made by a portable and readily manipulated power tool which is conviently provided with electrical power by an electric line (not shown). This electric line will not be wrapped around the cable even though the support 26 is turned around the axis of the cable because the tool is located at the end of the cable so that the electric line will not be wound around the same.

From what has been stated hereinabove, it will now be obvious that there is provided in accordance with the invention a portable sheath cutting tool comprising means to engage the sheath at longitudinally spaced positions on the latter and to hold the sheath in extended or taut condition between these positions, and that there is provided a support engaged on said means for a turning movement about the sheath, there being furthermore provided cutting means on the support to turn therewith and effect a circumferential cut in and around the sheath, there being furthermore provided power means on the support to drive the cutting means.

In further accordance with the invention an adjusting means is provided to adjust the radial positioning of the cutting means relative to the sheath. Moreover, there is preferably employed in accordance with the invention a circular saw which possesses in the structure of the invention particular advantages as, for example, in comparison with a bayonet-type saw.

To achieve the specific results of the invention there are employed two collars fastenable on the sheath of an electrical cable at spaced positions in concentric relationship with the sheath and with each other, there being furthermore provided a cylinder extending between the collars and coupled thereto, the cylinder being provided with a slot through which the circular saw extends in radial disposition to engage the sheath of the electrical cable which is accommodated in the bore of the cylinder.

There will now be obvious to those skilled in the art many modifications and variations of the structure set forth hereinabove. These modifications and variations will not depart from the scope of the invention if defined by the following claims.

What is claimed is:

1. A portable sheath cutting tool comprising two spaced means for engaging said sheath at longitudinally spaced positions and for stationarily holding said sheath in extended condition between said spaced positions, a support positioned between and rotatably attached to said two spaced means for turning about said sheath, cutting means on said support for turning therewith and effecting between said two spaced means a circumferential cut in and around said sheath, and power means on said support for driving said cutting means.

2. A portable sheath cutting tool as claimed in claim 1 comprising adjusting means to adjust the radial positioning of said cutting means relative to said sheath.

3. A portable sheath cutting tool as claimed in claim 2 wherein said cutting means is a circular saw.

4. A portable sheath cutting tool as claimed in claim 3 wherein the two spaced means includes two collars fastenable on said sheath at said spaced positions and in concentric relationship with said sheath and with each other.

5. A portable sheath cutting tool as claimed in claim 4 wherein said support is mounted on a cylinder extending between and rotatably attached to said collars, said cylinder including a bore through which said sheath extends.

6. A portable sheath cutting tool as claimed in claim 5 wherein said support is mounted on said cylinder by said adjusting means, said adjusting means including a guide for guiding the support in radial direction relative to said sheath and a threaded means for the threaded adjustment of said support.

7. A portable sheath cutting tool as claimed in claim 6 comprising bearing means on the support to hold said circular saw, and a gear train to couple said saw to said power means.

8. A portable sheath cutting tool as claimed in claim 7 wherein said power means is an electric motor.

9. A portable sheath cutting tool as claimed in claim 7 wherein said cylinder is provided with a slot through which said saw extends.

10. A portable sheath cutting tool as claimed in claim 7 wherein said gear train includes coupled bevel gears.

11. A portable sheath cutting tool as claimed in claim 7 comprising a U-shaped bracket on said cylinder and supporting said adjusting means.

12. A portable sheath cutting tool as claimed in claim 7 wherein each said collar includes three radially disposed threaded bolts for engaging and centering said sheath, said bolts being symmetrically disposed around the sheath.

* * * * *